(12) United States Patent
Hiestand

(10) Patent No.: US 9,352,436 B2
(45) Date of Patent: May 31, 2016

(54) CLAMPING DEVICE FOR MACHINE TOOLS

(76) Inventor: Karl Hiestand, Pfullendorf (DE)

(*) Notice: Subject to any disclaimer, the term of this patent is extended or adjusted under 35 U.S.C. 154(b) by 802 days.

(21) Appl. No.: 13/507,670

(22) Filed: Jul. 18, 2012

(65) Prior Publication Data

US 2013/0033010 A1 Feb. 7, 2013

(30) Foreign Application Priority Data

Jul. 19, 2011 (EP) ..................... 11174513

(51) Int. Cl.
*B23B 31/28* (2006.01)
*B23Q 17/00* (2006.01)

(52) U.S. Cl.
CPC .............. *B23Q 17/005* (2013.01); *B23B 31/28* (2013.01); *B23Q 17/003* (2013.01); *B23B 2260/044* (2013.01); *B23B 2260/062* (2013.01); *B23B 2260/128* (2013.01); *Y10T 279/21* (2015.01); *Y10T 279/27* (2015.01)

(58) Field of Classification Search
CPC ................ B23B 31/28; B23B 2260/62; B23B 2260/128; B23B 31/16229; B23B 31/26; B23Q 17/005; B23Q 17/003; Y10T 279/21; Y10T 279/27
See application file for complete search history.

(56) References Cited

U.S. PATENT DOCUMENTS

| | | |
|---|---|---|
| 4,573,379 A | 3/1986 | Bald |
| 4,748,357 A | 5/1988 | Kempken |
| 6,629,697 B1 | 10/2003 | Asai et al. |
| 8,752,281 B2 * | 6/2014 | Hangleiter .............. B23B 31/28 279/135 |
| 2015/0113790 A1 * | 4/2015 | Hiestand ................. B23B 31/28 29/559 |

FOREIGN PATENT DOCUMENTS

| | | | |
|---|---|---|---|
| DE | 102009044167 | 4/2011 | |
| EP | 1 114 685 | 7/2001 | |
| EP | 2363223 B1 * | 5/2013 | |
| EP | 2837450 A1 * | 2/2015 | ............. B23B 31/28 |
| GB | 2 194 615 | 3/1988 | |
| JP | 2013022725 A * | 2/2013 | |

* cited by examiner

Primary Examiner — Eric A Gates
Assistant Examiner — Paul M Janeski
(74) Attorney, Agent, or Firm — Pandiscio & Pandiscio

(57) ABSTRACT

In a clamping device for machine tools, the device is provided with a power-operated chuck and clamping jaws actuated by a draw rod, the clamping device having an electrical servomotor with a changeover function, a movement converter, and a force accumulator for maintaining clamping force, the movement converter and the force accumulator being integrated in a tube-shaped jacket piece inserted in a housing of the clamping device and divided into two parts connected together. A spindle nut of the movement converter is rotatably supported between the two parts by a projection, and spring packs of the force accumulator are clamped between stop rings and a cover on the jacket piece. The jacket piece is mounted within the housing as to be moved axially by the draw rod via the movement converter. It is possible to determine the clamping force prevailing in the power-operated chuck using only one measuring point.

26 Claims, 7 Drawing Sheets

CLAMPING DEVICE FOR MACHINE TOOLS

BACKGROUND OF THE INVENTION

1. Field of the Invention

The invention relates to a clamping device for machine tools, and provided with a power-operated chuck for holding a workpiece wherein clamping jaws can be actuated using the clamping device by means of an axially moveable draw rod, wherein the clamping device is provided with an electric servomotor with a changeover function for triggering clamping movements, a movement converter for converting adjustment movements of a rotor shaft of the servomotor into axial movements of the draw rod required for actuating the clamping jaws, as well as a force accumulator for maintaining a clamping force and comprising preloaded spring packs supported on a spindle nut of the movement converter.

2. Description of the Prior Art

A device of this kind for clamping a workpiece is disclosed in DE 10 2009 044 167 A1. In this embodiment, a spindle nut is embedded between two spring packs configured as helical compression springs, and a draw rod and the spindle nut each have a sensor in order to register their axial positions. The occurrence of a slight axial force in the form of contact between clamping jaws and the workpiece to be machine is recorded by means of a first sensor. The continued movement of the spindle nut against the force of one of the two spring packs is detected by a second sensor, and a resulting sensor differential between the two sensors is used for calculating a clamping force. The travel difference between the first sensor and the second sensor is thus measured continuously by both sensors, and is used for calculating the clamping force with the help of a control unit.

The spindle nut in the clamping device is undefinably clamped between the two spring packs inserted in adjustable bushes, in which case the spring characteristics of the spring packs cannot be the same. The sensor differential measured by the two sensors is thus subject to considerable inaccuracies, particularly since the spring forces can only apply a maximum of 50% of the particular clamping force and additional inaccuracies have to be tolerated because of unavoidable friction forces. Although the complexity of the clamping device and the control unit in particular is very considerable, unpredictable responses cannot be avoided or compensated for, with the effect that exact, position-dependent measurement of the clamping force is not possible.

SUMMARY OF THE INVENTION

The task of the present invention is, therefore, to create a clamping device of the aforementioned type such that it is possible to measure the clamping force accurately and straightforwardly in any operating position of the clamping device, and this can be done with only one travel sensor and without elaborate control units. The design complexity in order to achieve this is kept low, while, above all, it should be possible to achieve an adjustable preload of the spring packs and the clamping of the axial bearings independently of one another, and the selected preloads should be maintained constantly at all times. A measurement of the clamping force should be possible in one or both movement directions of the draw rod, while also a versatile range of applications should be guaranteed for the clamping device as a rotating or stationary module with a constantly high level of operational safety and a long service life.

In accordance with the present invention, this is achieved in a clamping device of the aforementioned type in that the movement converter and the force accumulator are integrated in a separate tube-shaped jacket piece as a functional unit which is inserted in a housing of the clamping device and is divided into two parts connected together in the axial direction of the draw rod when in the installation position, in that the spindle nut of the movement converter is rotatably supported between the two parts of the jacket piece, e.g., by means of a projection standing out from the spindle nut, in that the spring packs of the force accumulator are arranged in one or both parts of the jacket piece and are each clamped on one or both sides between a stop ring provided on the jacket piece and a cover formed as a circular ring held on the jacket piece, and in that the jacket piece can be moved axially to a limited extent by the draw rod via the movement converter, within the housing of the clamping device.

It is advantageous for the movement distance of the jacket piece, or the spindle nut of the movement converter, to be measured and evaluated by a travel sensor in order to determine the particular clamping force.

Furthermore, it is appropriate for each of the covers inserted in the jacket piece to be supported against the force of the spring packs by means of a bayonet lock and for the covers to be mounted so as to be movable to a limited extent in the direction of the spring packs, in which case the preload force of the spring packs of the force accumulator can be set to a constant predetermined value by means of the bayonet locks, and for a cavity allocated to the bayonet locks for axial movement of the covers to correspond to travel of the spring packs from a specified preload up to a maximum clamping force.

Furthermore, the total spring travel of the spring packs is dimensioned such that it is composed of the spring travel required for preloading, as well as the distance to be covered when tensioning the spring packs, which corresponds to the measurement travel of a switching ring connected to the jacket piece and the spindle nut.

The two parts of the jacket piece can be bolted or pressed together, and secured by pins.

It is also appropriate for the axial length of the functional unit to be shorter by a selectable distance than the distance between stop surfaces provided on a housing that houses the function unit.

Furthermore, at least one axial anti-friction bearing is arranged between the stop rings projecting from the jacket piece and the projection on the spindle nut, in which case the preload on an axial anti-friction bearing preferably is adjustable to a constant value by means of parts of the jacket piece that are adapted to be connected together.

Furthermore, it is appropriate for the jacket piece to be held in the housing of the clamping device and to be guided in an axially adjustable arrangement within the housing.

The spring packs of the force accumulator inserted in the jacket piece can each be formed by one or more cup springs which are adjustably clamped between the covers and the stop rings projecting from the jacket piece. It is also possible for the spring packs to be formed by different kinds of spring.

In order to measure the adjustment travel of the jacket piece or the spindle nut of the movement converter, each of these can be wound together with a switching ring, the axial adjustment movements of which can be recorded by the travel sensor and evaluated, in which case during measurement of the position change of the spindle nut of the movement converter, this should be linked to an axially adjustable intermediate element held within the housing of the clamping device, in which case the intermediate element is connected to the switching ring. In order to measure the adjustment travel of the jacket piece, the jacket piece can be provided with a permanent magnet, or magnetisable switching ring, inserted in its outer jacket surface, in which case the switching ring interacts directly with a travel sensor in a fixed arrangement.

Furthermore, a rotary encoder should be allocated to a servomotor, by means of which a particular operating position of the servomotor, or the draw rod, can be recorded and evaluated.

The movement converter can easily be configured as a planetary roller thread and consist of several anti-friction elements configured as rollers and rotatably mounted in or on the spindle nut as rollers, in which case the anti-friction elements engage in a thread worked into the draw rod, as a result of which the spindle nut, which can be driven by the servomotor, is able to form the radially outer or inner component of the movement converter.

In accordance with an embodiment variant, the spindle nut can be supported directly on the draw rod in the axial direction. In this case, it is possible to connect the spindle nut via a trapezoidal thread to a positioning element as part of the jacket piece, which interacts with the travel sensor.

In this embodiment, the spindle nut should have a planetary gear unit, preferably a differential planetary gear unit, connected at its input end, in which case the positioning element and the spindle nut are each connected to the planetary gears that can be driven by the servomotor, in a driving connection via sun wheels with different tooth counts.

Furthermore, in order to improve operational reliability, it is advantageous for a controllably adjustable sliding sleeve to be inserted as a positively locking coupling in the driveline of the clamping device between the servomotor and the movement converter, by means of which when the clamping device is in its clamped position the movement converter can be decoupled from the servomotor, and the movement converter can be connected to the housing of the clamping device, preferably by means of synchronisable ring gears.

The housing which accommodates the jacket piece and/or the jacket piece itself should be sealed so as to be leak-tight to liquids, and it should be possible to fill them with a lubricant. Also, the housing of the clamping device preferably is rotationally symmetrical in the rotating usage and is provided with several apexes in a stationary arrangement, and the clamping device is configured so as to act on one or both sides.

In accordance with a further embodiment, there is provision for the draw rod to have a limit switch allocated to it, which can be actuated, for example, by a switching ring directly attached to the draw rod. In this way, it is possible for the opening distance of the power-operated chuck to be limited in order to avoid the clamping jaws being opened too far and dirt getting into the power-operated chuck.

If a clamping device is configured in accordance with the present invention, it is possible to determine with extreme accuracy what is the clamping force prevailing in the power-operated chuck using only one measuring point, depending on the movement travel of the draw rod and without the need for imprecise differential measurements or an elaborate control unit. This is because when the movement converter and the force accumulator are used jointly in one jacket piece, thereby forming a functional unit, it is possible to transfer the movement travel of the draw rod outward via the function unit as the clamping force is built up. The movement travel of the particular clamped spring pack resulting in this case provides the magnitude of the clamping force acting on the workpiece.

In this case, it is of particular advantage that the clamping of the axial bearings supporting the spindle nut and the preload on the spring packs always remain constant. The jacket piece is in two parts and the two pieces are fixed in their limit position once the preload has been set, therefore the same preload is guaranteed in each operating condition of the function unit. Also, the covers supported by bayonet locks ensure that the preload of the spring packs of the force accumulator also remains constant, although because the covers are pushed in the direction of the spring packs when the jacket piece makes contact with the stop surfaces, the clamping force required in this power-operated chuck is built up. And the travel distances, by means of the spring packs, are compressed during clamping procedures in an approximately linear relationship to the clamping forces that are built up and act on the workpiece, meaning that they can be acquired by means of a travel sensor.

The clamping device configured in this manner thus makes it possible to ascertain in a straightforward manner the clamping force provided in the power-operated chuck allocated to the clamping device with extreme accuracy and to evaluate this force without a control unit. In addition, the clamping device can be used in a variety of ways as a stationary or rotationally driven structural unit, because while the interior of the function unit is sealed, it can be used without malfunctions over a longer period with a high level of operational reliability. Therefore, a clamping device is created which not only has a relatively simple structure, and thus can also be manufactured economically, but in which the built-up clamping force is maintained automatically by means of a self-locking differential planetary gearbox. In addition, a low level of energy is to operate the clamping device, and the servomotor can be taken out of operation when the function unit is supported on the housing.

BRIEF DESCRIPTION OF THE DRAWINGS

The drawings show a sample embodiment of a clamping device configured in accordance with the present invention, as well as variations, the details of which are explained below. In the drawings.

DESCRIPTION OF THE PREFERRED EMBODIMENTS

Figure 1:
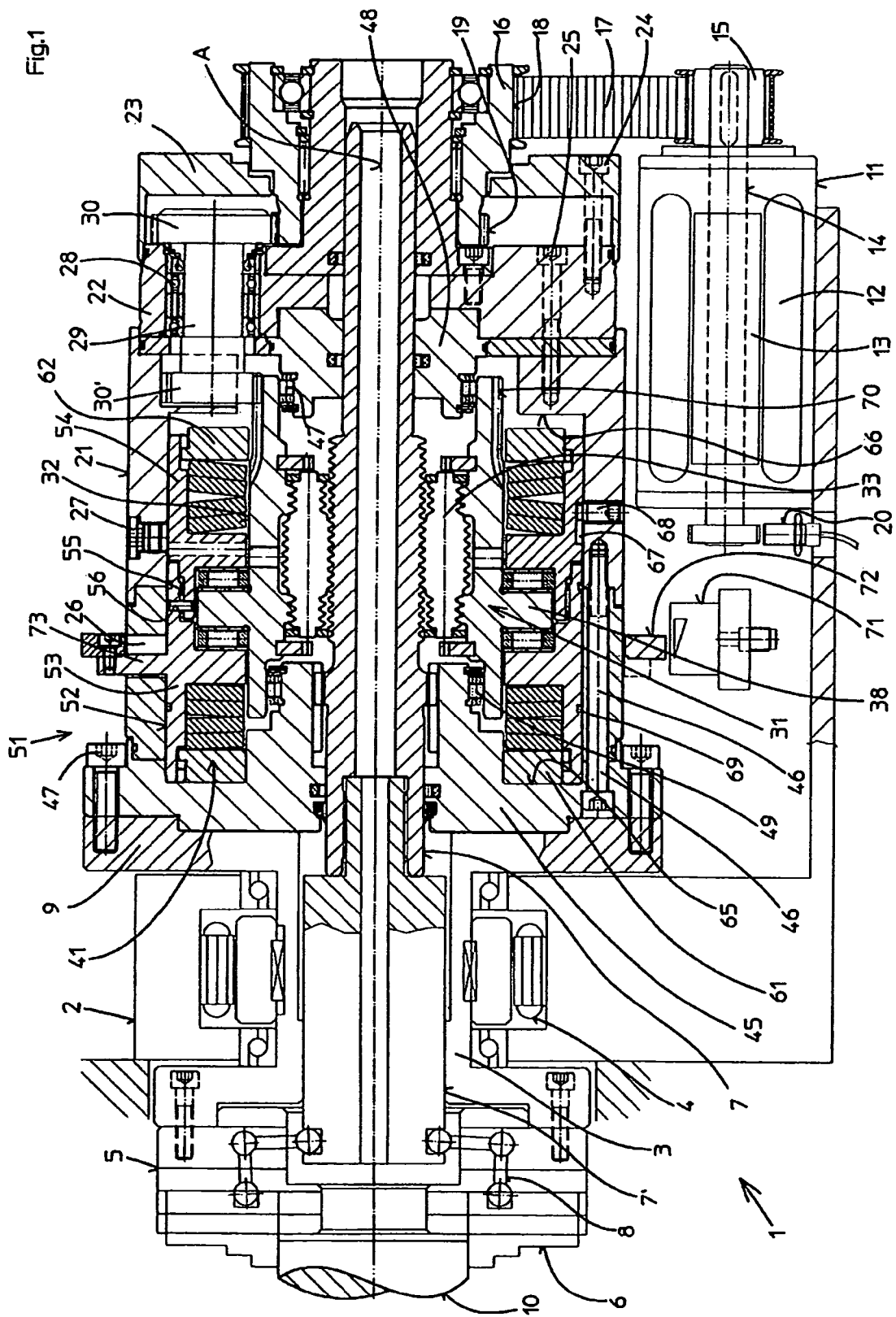
FIG. 1 shows a clamping device in an axial section during a machining procedure.
Figure 2:
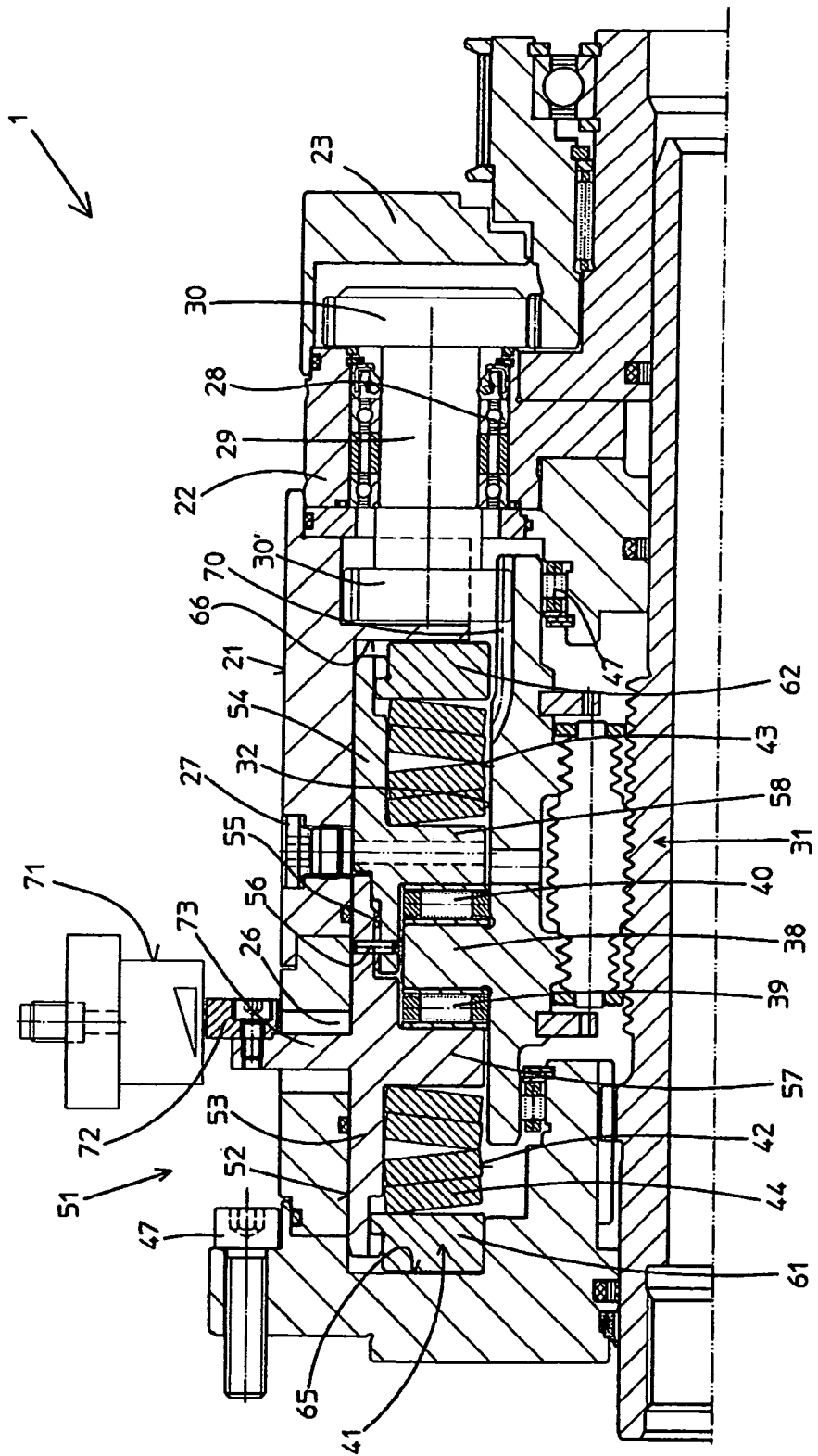
FIG. 2 shows the clamping device in accordance with FIG. 1 in a half-section and magnified view, in neutral position.
Figure 3:
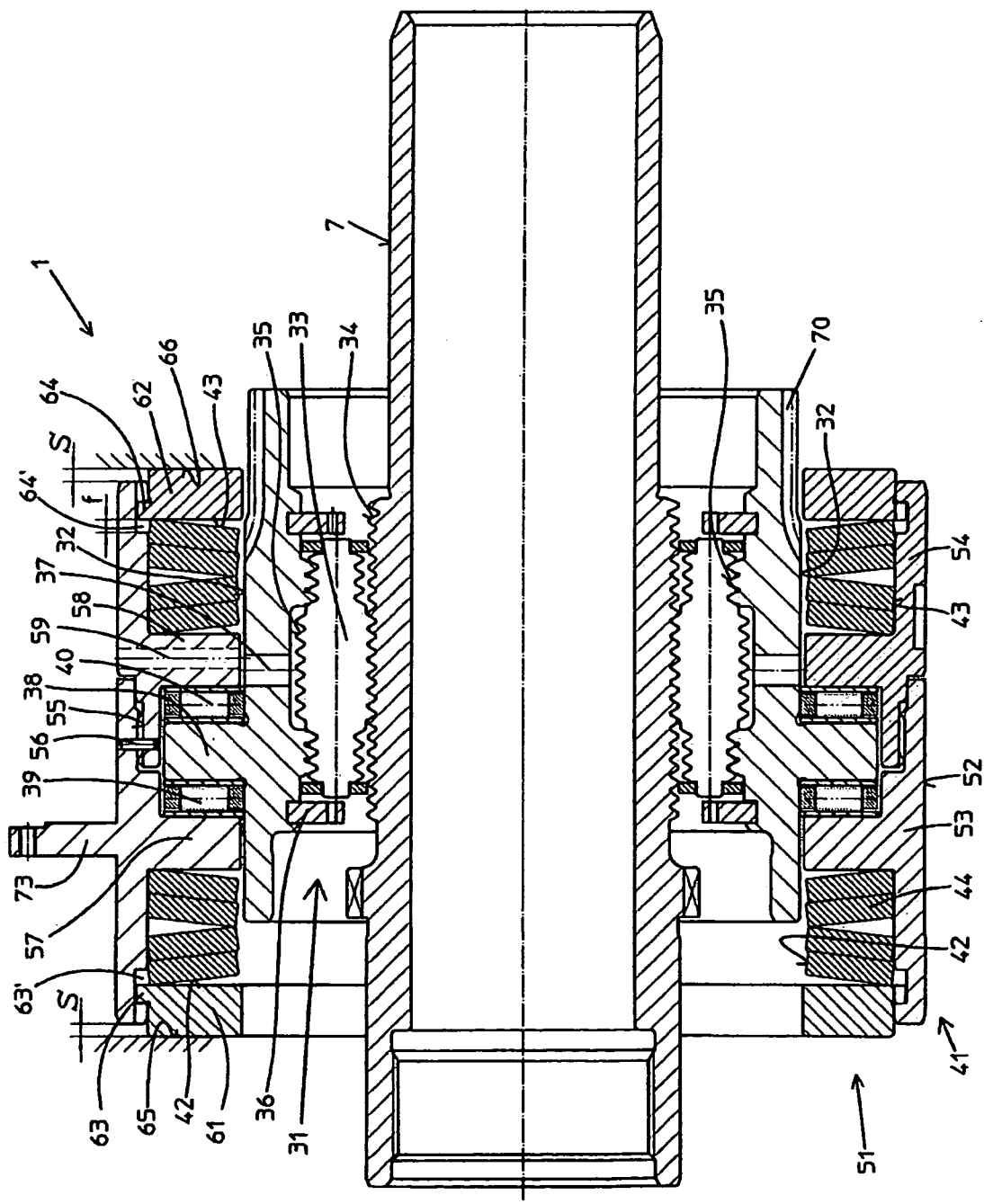
FIG. 3 shows the clamping device in accordance with FIG. 2 in a half-section and schematic view.

The clamping device illustrated in FIGS. 1 to 3 and identified by 1 is used for actuating a power-operated chuck 5 arranged on a machine tool 2, by means of radially adjustable clamping jaws 6 on which a workpiece 10 to be machined can be clamped in the chuck 5. The clamping jaws 6 of the power-operated chuck 5 in this case can be actuated via relay levers 8 by an axially adjustable, two-piece draw rod 7, 7' is in a driving connection with an electric servomotor 11 that has a changeover function by means of a movement converter 31. The movement converter 31 converts rotational movements of the servomotor 11 into axial feed movements of the draw rod 7, 7'.

The servomotor 11 consists of a stator 12 in a fixed location located with its axis in parallel to a lengthways axis A of the clamping device 1, and of a rotor 13 with a pinion 15 connected in a rotationally fixed arrangement with the rotor shaft 14 of the rotor 13, with a toothed belt 17 guided over the pinion 15 and interacting with a drive gear 16 allocated to the clamping device 1. However, the servomotor 11 can also be arranged axially perpendicular to the lengthways axis A of the clamping device and be in a driving connection with the drive gear 16 by means of bevel gears, for example.

The clamping device 1 is provided with a housing 21 which accommodates the movement converter 31 and a force accumulator 41. On the side of the housing 21 facing towards the machine tool 2, the housing 21 is closed by a sealing cover 45 which is held on the housing 21 by bolts 46 and on a flange 9 by additional bolts 47, in which case the flange 9 is formed on a machine spindle 3 that carries a drive motor 4 of the machine tool 2. On an opposite side, the housing 21 is connected with an intermediate piece 22 and sealing cover 23 that are connected together by bolts 24 and are connected to the housing 21 by bolts 25.

In the intermediate piece 22, several shafts 29 are mounted in a rotating arrangement in holes 28, and the shafts 29 carry gears 30 and 30' on their ends. In this case, the gears 30 engage in gearing 19 worked onto the drive gear 16, whereas the gears 30' engage in gearing 70 provided on a spindle nut 32 of the movement converter 31, with the effect that a driven connection is established between the servomotor 11 and the movement converter 31.

The movement converter 31 is configured as a planetary roller gearbox and, in the embodiment shown in FIG. 1, consists of the spindle nut 32 supported by means of an anti-friction bearing 49 in a rotating arrangement on the sealing cover 45 and of a bearing disc 48, as well as of a relatively large number of anti-friction bodies 33 in a rotating mounting configured as rollers, which are held between snap rings 36. The spindle nut 32, as well as the anti-friction bodies 33, are each provided with grooves 35. In contrast, a thread 34 is worked into the draw rod 7, with the effect that when the spindle nut 32 is rotated by being driven by the servomotor 11, the anti-friction bodies 33 are supported around their circumference and by themselves in the thread 34 of the draw rod 7. In this way, the rotational movement of the spindle nut 32 is converted into an axial movement and the draw rod 7 and is pushed to the right or left, depending on the direction of rotation of the spindle nut 32, and the clamping jaws 6 of the power-operated chuck 5 are adjusted accordingly.

The force accumulator 41 acting on the draw rod 7, 7' in order to permit clamping in both adjustment directions of the draw rod 7, 7', is made up of two spring packs 42 and 43, each of which consists of cup springs 44 and are inserted opposite to one another in a tube-shaped jacket piece 52. The arrangement of the force accumulator 41 and of the movement converter 31 in the jacket piece 52 thus creates a functional unit 51 which can be moved in the axial direction by the movement converter 31 in accordance with the particular clamping force prevailing in the power-operated chuck 5, with the effect that the particular clamping force acting on the workpiece 10 can be ascertained by means of the position of the function unit 51.

The spring packs 42 and 43 are arranged in the jacket piece 52 under preload, but with a limited range of axial movement. This purpose is served by the covers 61 and 62 which are each supported on the ends of the jacket piece 52 by means of a bayonet lock 63 or 64. The bayonet locks 63 and 64 have cavities 63' or 64' extending in the direction of the spring packs 42 and 43 assigned to them, with the effect that the covers 61 or 62 are pushed inwards when the covers are in contact against the sealing cover 45, or against stop surfaces 65 or 66 provided on the sealing cover 45 or the housing 21, as shown in FIG. 1, which means the spring packs 42 or 43 are pressed together.

In order to make this possible, the jacket piece 52 is provided with inwardly projecting stop rings 57 and 58, with the spring packs 42 or 43 inserted and preloaded between the stop rings 57 and 58 and the covers 61 and 62. In addition, the jacket piece 52 consists of two parts 53 and 54 that are connected together by a thread 55.

Axial anti-friction bearings 39 and 40 are inserted between a projection 38 pointing outwards from the spindle nut 32 of the movement converter 31 and the stop rings 57 and 58, by means of which axial anti-friction bearings 39 and 40 the spindle nut 32 is mounted in a rotating arrangement. In order to allow the preload of the axial anti-friction bearings 39 and 40 to be set to a specified value, the two jacket parts 53 and 54 of the jacket piece must be screwed on in a corresponding manner. In order for the set preload to be maintained, both parts 53 and 54 are secured by a pin 56 inserted in the area of the thread 55. In accordance with FIG. 5, however, the two parts 53 and 54 can also be connected together by pressing and secured by pins, if necessary.

The function unit 51 is connected to the jacket piece 52 in a rotationally fixed arrangement by means of a pin 68 that engages in a slot 67 worked into the outer jacket surface of the jacket piece 52, although a limited axial movement is permitted in the jacket piece 52 between the stop surfaces 65 and 66. In addition, the interior of the function unit 51 is sealed so as to be liquid-tight by means of several seals 69, and can be filled with lubricant by means of a grease nipple 27 screwed into the jacket piece 52, as well as various holes 37 and 59.

In a clamping procedure as shown in FIG. 1, the servomotor 11, equipped with a rotary encoder 20 for ascertaining the particular operating position, is switched on, and by means of the tooth belt 17, the drive gear 16, and the gears 30 and 30', and the spindle nut 32 of the movement converter 31 are set in rotation. As a result, the anti-friction bodies 33 are moved axially to the right or left, depending on the direction of rotation of the servomotor 11, with the effect that the clamping jaws 6 of the power-operated chuck 5 are pressed against the workpiece 10, or else the workpiece 10 is released.

In the view shown in FIG. 2, the workpiece 10 is clamped. The function unit 51 has been pushed to the left during the clamping procedure by means of the movement converter 31, because its anti-friction bodies 33 engage in the thread 34 provided on the draw rod 7, and the projection 38 from the spindle nut 32 is clamped between the axial anti-friction bearings 39 and 40. The cover 61 is thus pressed against the stop surface 65 with the effect that the cup spring pack 42 is pressed together approximately to the blocking length. This operating position of the spring pack 43 corresponds to the maximum clamping force in the power-operated chuck 5. The set preload of the spring pack 43 arranged on the opposite side is not changed in this case, because it is maintained by the cover 62 held in place by the bayonet lock 64. Also, the clamping of the two axial anti-friction bearings 39 and 40 remains constant. This is because the position of the two parts 53 and 54 of the jacket piece, which are connected together and secured by the pin 56, is not changed.

By means of the movement travel of the spring pack 42—and if the clamping direction is the opposite one, then of course also by means of the movement travel of spring pack 43—the clamping force prevailing in the power-operated chuck 5 in each case can be determined without difficulties. For this purpose, a switching ring 72 is provided in the embodiment in accordance with FIG. 1, which is attached to a projection 73 from the part 53 of the jacket piece 52, and interacts with a travel sensor 71 which is in a fixed location. The projection 73 is guided externally by a slot 26 worked into the housing 21. In accordance with FIG. 5, however, the switching ring 72″ can also consist of a permanent magnet inserted in the outer jacket surface of the housing 21, which acts on the travel sensor 71.

Figure 6:
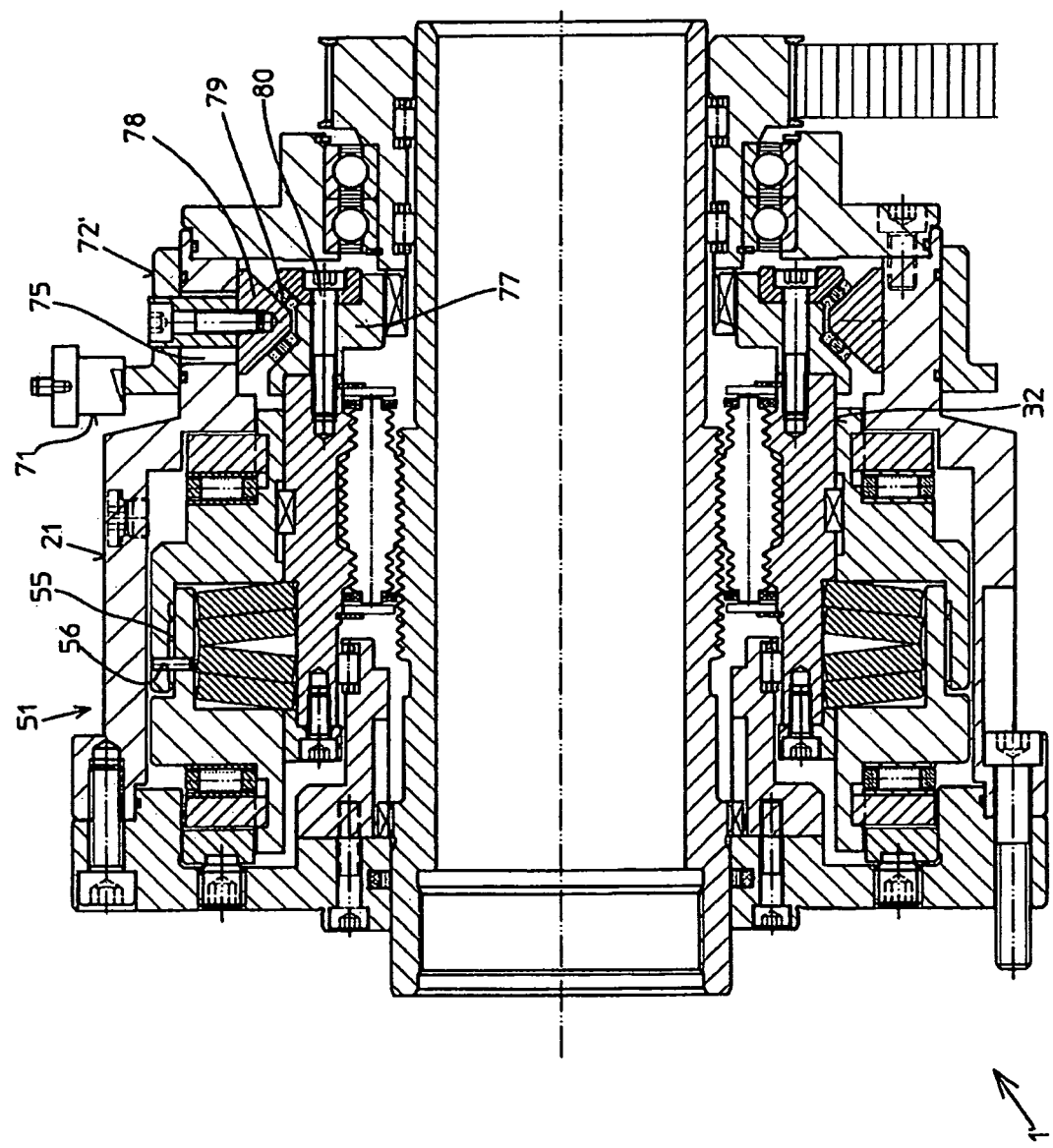
FIG. 6 shows the clamping device in accordance with FIG. 5, in a modified embodiment.

In the clamping device 1′ shown in FIG. 6, however, it is possible to register the adjustment movements of the spindle nut 32 and to determine the clamping force in accordance with the axial position of the spindle nut 32. For this purpose, the spindle nut 32 has an intermediate piece 77 attached to it by bolts 80, with an additional intermediate piece 78 supporting in it using ring 79. The axial adjustment movements of the spindle nut 32 are thus transferred to a switching ring 72′ firmly connected to the intermediate piece 78, in which case the switching ring 72′ is movably held in a slot 75 in the housing 21, and the axial adjustment movements can be evaluated as a measurement of the particular applied clamping force.

Figure 4:
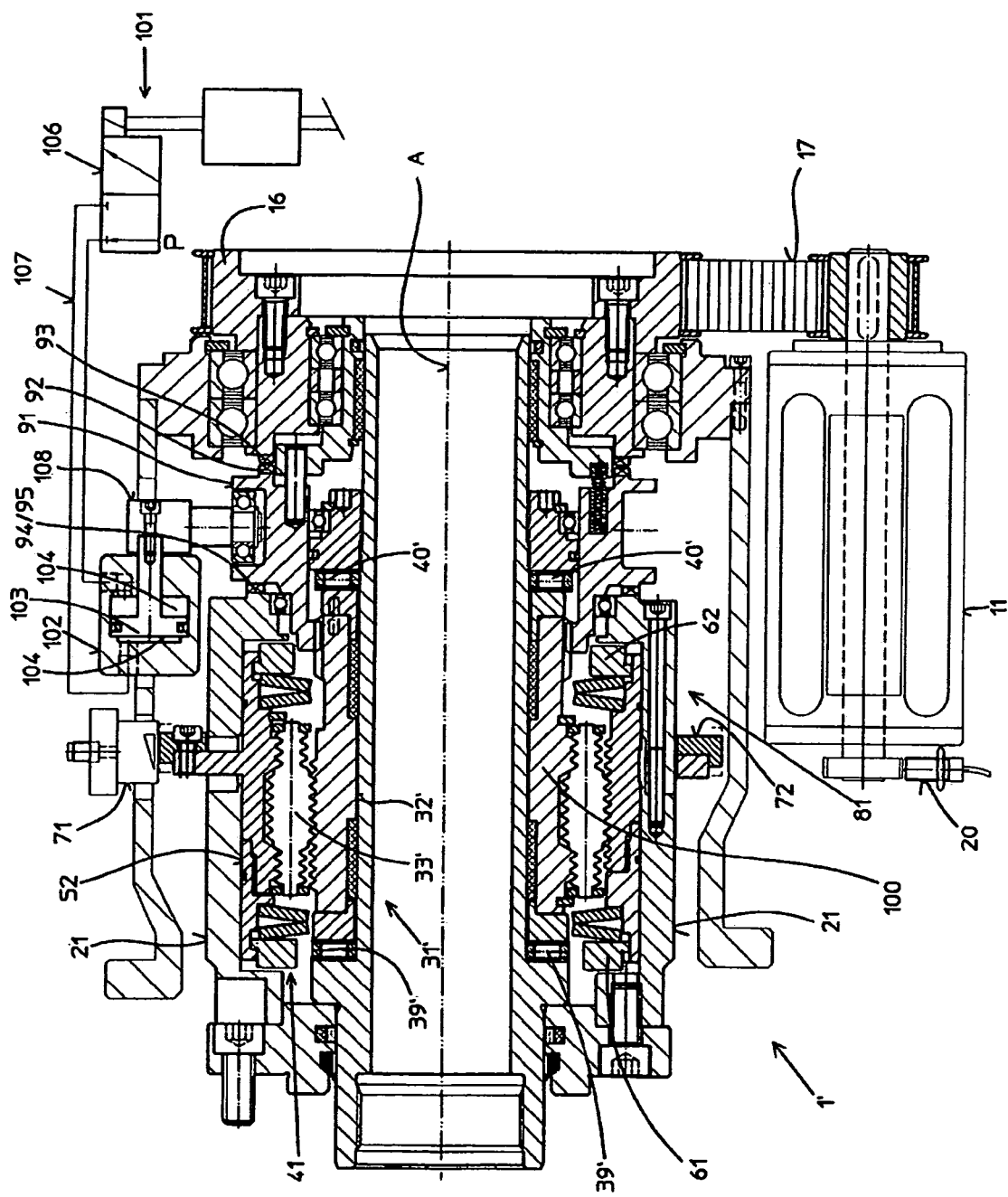
FIG. 4 shows the clamping device in accordance with FIG. 1, in a modified embodiment and with additional units.
Figure 7:
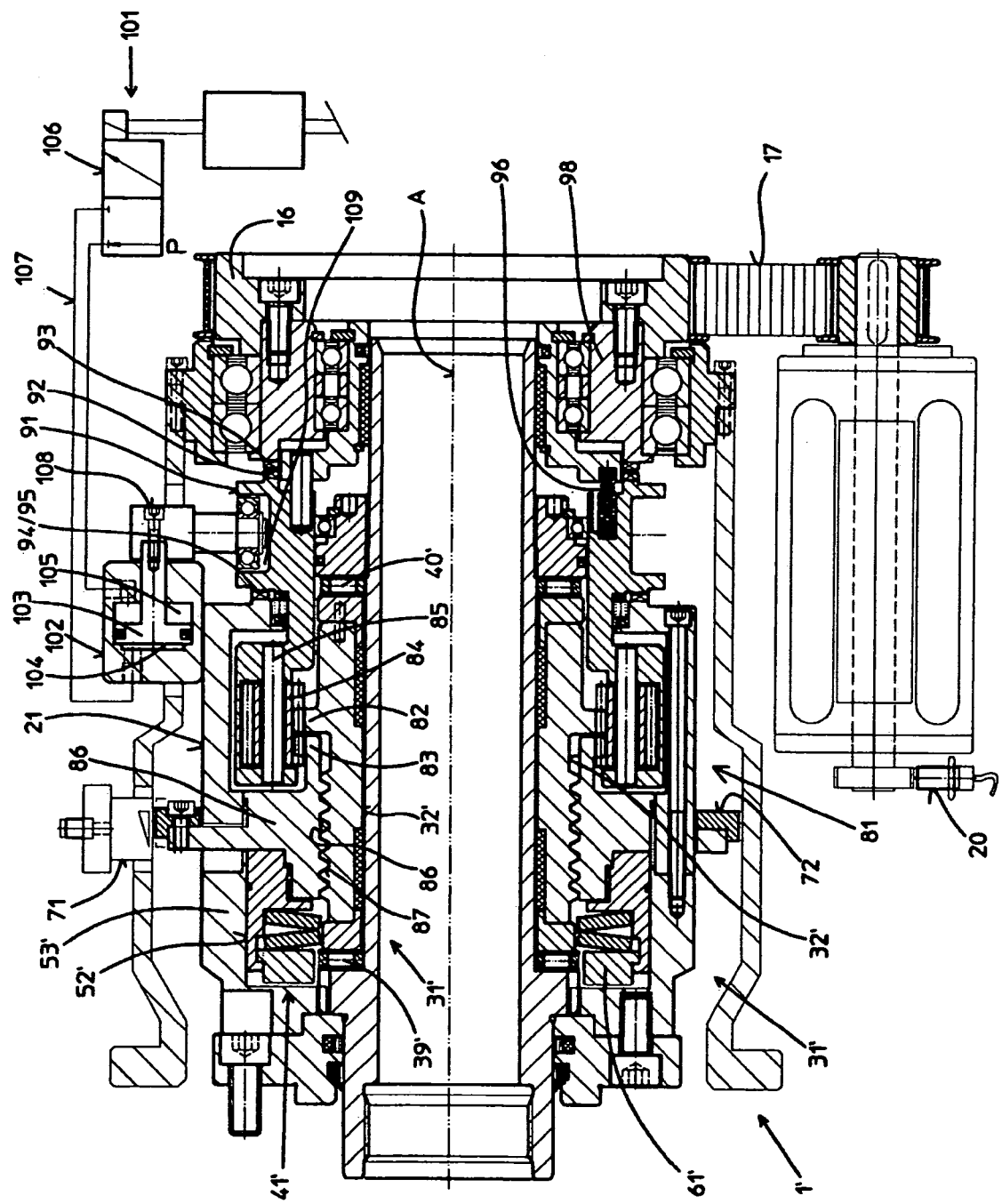
FIG. 7 shows a further embodiment of the clamping device in accordance with FIG. 5.

In the embodiment variants shown in FIGS. 4 and 7, the clamping device 1′ has a controllably adjustable sliding sleeve 91 inserted in its driveline as a positively locking coupling, in order to increase the operating reliability, in which case in the clamping position, the positively locking coupling enables the movement converter 31′ to be decoupled from the servomotor 11 and the movement converter 31′ can be connected to the housing 21. During a clamping procedure, the drive energy is transferred to the sliding sleeve 91 from the drive gear 16 by means of a ring gear 93 attached to the drive gear 16, and a ring gear 92 provided on the sliding sleeve 91, in which case the sliding sleeve 91, in the embodiment shown in FIG. 7, is connected to the movement converter 31′ via a planetary gear unit 81. By means of a servo device 101, or compression springs 96, however, in the event of an electrical power failure, the sliding sleeve 91, with gearing 94, is inserted into gearing 95 worked onto the housing 21, with the effect that the movement converter 31 is supported against the housing 21 and is thus blocked.

The servo device 101 for actuating the sliding sleeve 91 consists of a piston 103 inserted in a cylinder 102 with a pressurised medium able to act on it from both sides. The piston 103 is drivably connected to a circumferential groove 109 by means of an angle piece 108, in which case the groove 109 is worked into the sliding sleeve 91.

When pressurised medium is supplied in a controlled manner to the pressure chambers 104 or 105 of the servo device 101 via a valve 106 and pressure lines 107, then the piston 103 and, with it, the angle piece 108, are pushed to the right or left. The sliding sleeve 91 is entrained by the angle piece 108, with the effect that it is also moved to the right or left and the gearing 92 or 94 provided on the end faces of the sliding sleeve 91 alternately engage in the ring gear 93 attached to the drive gear 16, or in the ring gear 95 worked onto the housing 21.

Figure 5:
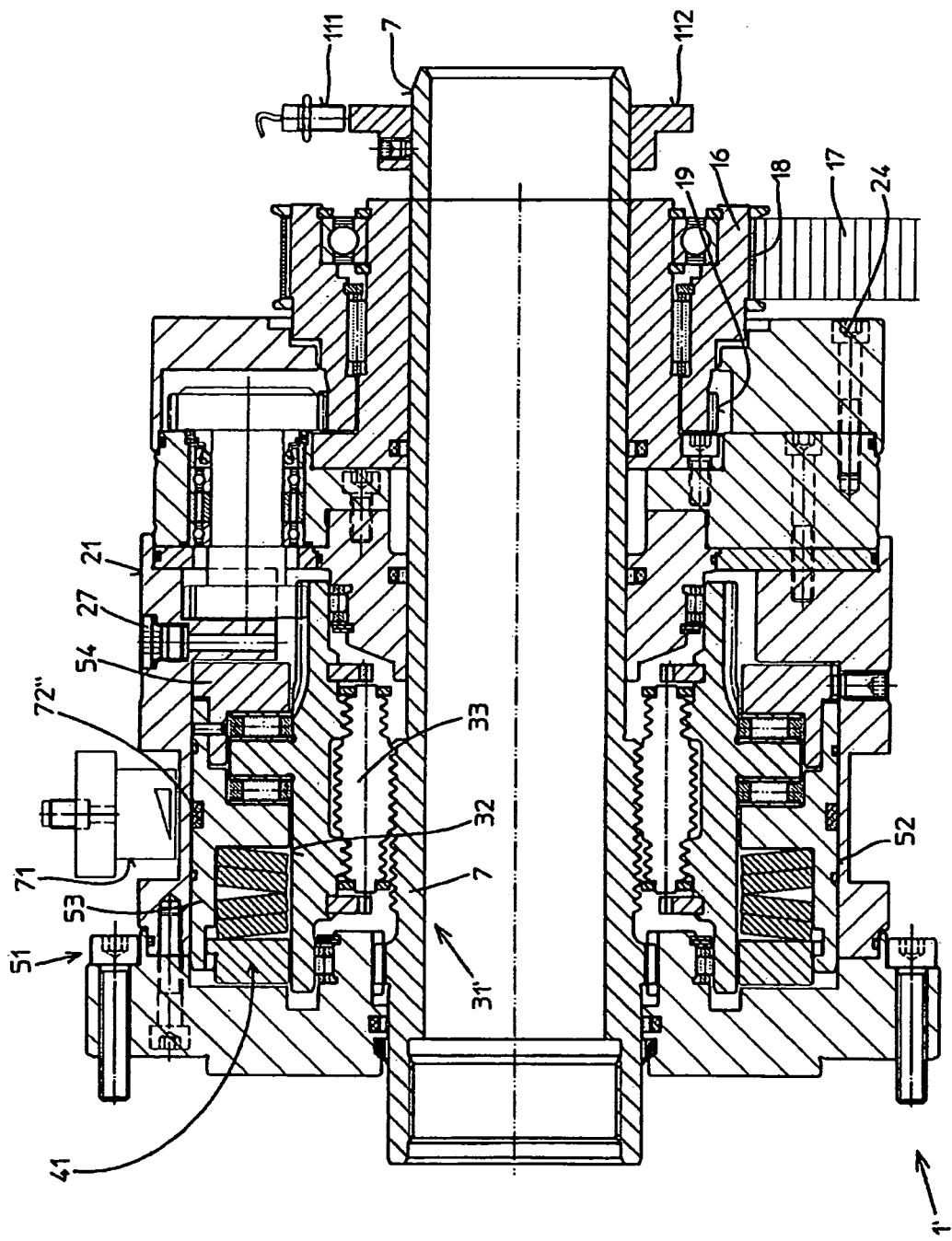
FIG. 5 shows the clamping device in accordance with FIG. 1, in an embodiment acting on one side.

The clamping device 1 in accordance with FIGS. 1 to 4 has a double-action configuration. FIGS. 5 to 7, on the other hand, only represent a single-action clamping device 1′ in various embodiments. In accordance with FIGS. 4 and 7, in contrast with the clamping device 1, the anti-friction bodies 33′ of the movement converter 31′ engage in an intermediate piece 100 that is immovably supported in the draw rod 7 by means of anti-friction bodies 39′ and 40′.

In the embodiment shown in FIG. 7, the movement converter 31′ has the planetary gear unit 81 configured as a differential planetary gear unit connected on its input end, with each of planetary gears 84 of the planetary gear unit 81 mounted in a rotating arrangement on a shaft 85 in a shoulder of the sliding sleeve 91. Sun gears 82 and 83, which interact with the planet gears 84, are connected, on the one hand, with the spindle nut 32′ and, on the other hand, with a positioning element 86 as a part 53′ of the jacket piece 52. The positioning element 86 in this case is attached to the part 53′ by means of a screw connection 86′. In addition, the sun gears 82 and 83 have different tooth counts, with the effect that a large stepdown ratio is created and the positioning nut 32′ and the positioning element 86 can be connected together by trapezoidal threads 87 and 88 which are inexpensive to manufacture.

Furthermore, the clamping device 1′ can, as indicated in FIG. 5, also be provided with a limit switch 111 allocated to it, by means of which the opening travel of the clamping jaws 6 of the power-operated chuck 5 can be limited. For this purpose, a switching ring 112 is attached to the draw rod 7, and the switching ring 112 interacts with the limit switch 111 in one or both movement directions of the draw rod 7.

The invention claimed is:

1. A clamping device for a machine tool, the clamping device comprising a power-operated chuck for holding a workpiece and clamping jaws adapted to be actuated by an axially moveable draw rod, wherein the clamping device further comprises an electric servomotor for triggering clamping movements, a movement converter for converting adjustment movements of a rotor shaft of said servomotor into axial movements of the draw rod for actuating said clamping jaws, and a force accumulator for maintaining a clamping force, the force accumulator comprising preloaded spring packs supported on a spindle nut of said movement converter, wherein said movement converter and said force accumulator are integrated in a jacket piece as a functional unit which is disposed in a housing of the clamping device and is divided into two parts connected together in an axial direction of the draw rod; the spindle nut being rotatably supported between the two parts of the jacket piece by means of a projection extending from the spindle nut, wherein said spring packs are arranged in both parts of the jacket piece, each being clamped between stop rings provided on the jacket piece and a cover comprising a circular ring held on the jacket piece, wherein the jacket piece is moveable axially by the draw rod via said movement converter within the housing of the clamping device;

wherein the cover disposed in the jacket piece is supported against a force of said spring packs by a bayonet lock and is mounted to be movable in a direction of said spring packs.

2. The clamping device in accordance with claim 1, and further comprising a travel sensor, wherein a movement distance of the jacket piece and the spindle nut of said movement converter are adapted to be measured and evaluated by said travel sensor to determine a clamping force.

3. The clamping device in accordance with claim 1, wherein a preload force of said spring packs of said force accumulator is adapted to be set to a constant predetermined value by means of the bayonet locks.

4. The clamping device in accordance with claim 3, wherein a cavity allocated to the bayonet locks for axial movement of the covers corresponds to travel of said spring packs from their preload to a maximum clamping force.

5. The clamping device in accordance with claim 4, wherein a total spring travel of said spring packs comprises spring travel required for preloading, and a distance to be covered when tensioning said spring packs.

6. The clamping device in accordance with claim 5, wherein two parts of the jacket piece are adapted to be secured together.

7. The clamping device in accordance with claim 5, wherein an axial length of the functional unit is shorter by a selectable distance than a distance between stop surfaces provided on the housing of the functional unit.

8. The clamping device in accordance with claim 1, wherein at least one axial anti-friction bearing is disposed between the stop rings projecting from the jacket piece and the projection on the spindle nut, the preload on the axial anti-friction bearing being adjustable to a constant value by means of the parts of the jacket piece.

9. The clamping device in accordance with claim 8, wherein the jacket piece is disposed in the housing of the clamping device and is guided in an axially adjustable arrangement within the housing.

10. The clamping device in accordance with claim 9, wherein said spring packs of said force accumulator inserted in the jacket piece comprise at least one cup spring adjustably clamped between the cover and the stop rings projecting from the jacket piece.

11. The clamping device in accordance with claim 10, wherein to measure adjustment travel of the jacket piece or the spindle nut of said movement converter, each interacting with a switching ring, axial adjustment movements of which are recorded by said travel sensor and evaluated.

12. The clamping device in accordance with claim 11, wherein to measure adjustment travel of the jacket piece, a selected one of a permanent magnet and a magnetisable switching ring is disposed in an outer jacket surface, and the magnet or switching ring interacts directly with said travel sensor.

13. The clamping device in accordance with claim 1, wherein a rotary encoder is allocated to said servomotor, by means of which an operating position of said servomotor or the draw rod is recorded and evaluated.

14. The clamping device in accordance with claim 1, wherein said movement converter comprises a planetary roller thread and a plurality of anti-friction element rollers rotatably mounted in or on the spindle nut, wherein the anti-friction elements engage in a thread in the draw rod.

15. The clamping device in accordance with claim 14, wherein the spindle nut driven by said servomotor forms a radially outer or inner component of said movement converter.

16. The clamping device in accordance with claim 14, wherein the spindle nut is supported on the draw rod in an axial direction.

17. The clamping device in accordance with claim 16, wherein the spindle nut is connected by a trapezoidal thread to a positioning element as part of the jacket piece, which interacts with said sensor.

18. The clamping device in accordance with claim 17, wherein the spindle nut is provided with a planetary gear unit, connected at its input end, such that the positioning element and the spindle nut are each connected to planetary gears driven by said servomoto, in a driving connection via sun wheels provided with different tooth counts.

19. The clamping device in accordance with claim 1, wherein a controllably adjustable sliding sleeve is disposed as a positively locking coupling in a driveline of the clamping device between said servomotor and said movement converter, such that when the clamping device is in a clamped position, said movement converter is adapted to be decoupled from said servomotor and said movement converter is adapted to be connected to the housing of the clamping device by means of synchronisable ring gears.

20. The clamping device in accordance with claim 1, wherein a selected one of the housing which accommodates the jacket piece, and the jacket piece, is sealed leak-tight to liquids and adapted to be filled with a lubricant.

21. The clamping device in accordance with claim 1, wherein the housing of the clamping device is rotationally symmetrical in a rotating usage, and is provided with a plurality of apexes in a stationary arrangement.

22. The clamping device in accordance with claim 21, wherein said clamping device is configured to act on selectively one or two sides of the jacket piece.

23. The clamping device in accordance with claim 1, wherein movement of the draw rod is limited by a limit switch, which is adapted to be actuated by a switching ring attached to the draw rod.

24. A clamping device for a machine tool, the device comprising a power-operated chuck for holding a workpiece and clamping jaws adapted to be actuated by an axially moveable draw rod, wherein the clamping device further comprises an electric servomotor for triggering clamping movements, a movement converter for converting adjustment movements of a rotor shaft of said servomotor into axial movements of the draw rod for actuating said clamping jaws, and a force accumulator for maintaining a clamping force, and comprising preloaded spring packs supported on a spindle nut of said movement converter, wherein said movement converter and said force accumulator are integrated in a jacket piece as a functional unit which is disposed in a housing of the clamping device and is divided into two parts connected together in an axial direction of the draw rod; the spindle nut being rotatably supported between two parts of the jacket piece by means of a projection extending from the spindle nut, said spring packs being arranged in both parts of the jacket piece, each being clamped on both sides between stop rings provided on the jacket piece, and a cover comprising a circular ring held on the jacket piece, wherein the jacket piece is moveable axially by the draw rod via said movement converter, within the housing of the clamping device;

wherein at least one axial anti-friction bearing is disposed between the stop rings projecting from the jacket piece and the projection on the spindle nut, the preload on the axial anti-friction bearing being adjustable to a constant value by means of the parts of the jacket piece.

25. A clamping device for a machine tool, the device comprising a power-operated chuck for holding a workpiece and clamping jaws adapted to be actuated by an axially moveable draw rod, wherein the clamping device further comprises an electric servomotor for triggering clamping movements, a movement converter for converting adjustment movements of a rotor shaft of said servomotor into axial movements of the draw rod for actuating said clamping jaws, and a force accumulator for maintaining a clamping force, and comprising preloaded spring packs supported on a spindle nut of said movement converter, wherein said movement converter and said force accumulator are integrated in a jacket piece as a functional unit which is disposed in a housing of the clamping device and is divided into two parts connected together in an axial direction of the draw rod; the spindle nut being rotatably supported between two parts of the jacket piece by means of a projection extending from the spindle nut, said spring packs being arranged in both parts of the jacket piece, each being clamped on both sides between stop rings provided on the jacket piece, and a cover comprising a circular ring held on the jacket piece, wherein the jacket piece is moveable axially by the draw rod via said movement converter, within the housing of the clamping device;
- wherein said movement converter comprises a planetary roller thread and a plurality of anti-friction element rollers rotatably mounted in or on the spindle nut, wherein the anti-friction elements engage in a thread in the draw rod;
- wherein the spindle nut is supported on the draw rod in an axial direction;
- wherein the spindle nut is connected by a trapezoidal thread to a positioning element as part of the jacket piece, which interacts with said sensor.

26. A clamping device for a machine tool, the device comprising a power-operated chuck for holding a workpiece and clamping jaws adapted to be actuated by an axially moveable draw rod, wherein the clamping device further comprises an electric servomotor for triggering clamping movements, a movement converter for converting adjustment movements of a rotor shaft of said servomotor into axial movements of the draw rod for actuating said clamping jaws, and a force accumulator for maintaining a clamping force, and comprising preloaded spring packs supported on a spindle nut of said movement converter, wherein said movement converter and said force accumulator are integrated in a jacket piece as a functional unit which is disposed in a housing of the clamping device and is divided into two parts connected together in an axial direction of the draw rod; the spindle nut being rotatably supported between two parts of the jacket piece by means of a projection extending from the spindle nut, said spring packs being arranged in both parts of the jacket piece, each being clamped on both sides between stop rings provided on the jacket piece, and a cover comprising a circular ring held on the jacket piece, wherein the jacket piece is moveable axially by the draw rod via said movement converter, within the housing of the clamping device;
- wherein a controllably adjustable sliding sleeve is disposed as a positively locking coupling in a driveline of the clamping device between said servomotor and said movement converter, such that when the clamping device is in a clamped position, said movement converter is adapted to be decoupled from said servomotor and said movement converter is adapted to be connected to the housing of the clamping device by means of synchronisable ring gears.

* * * * *